Figure 1:
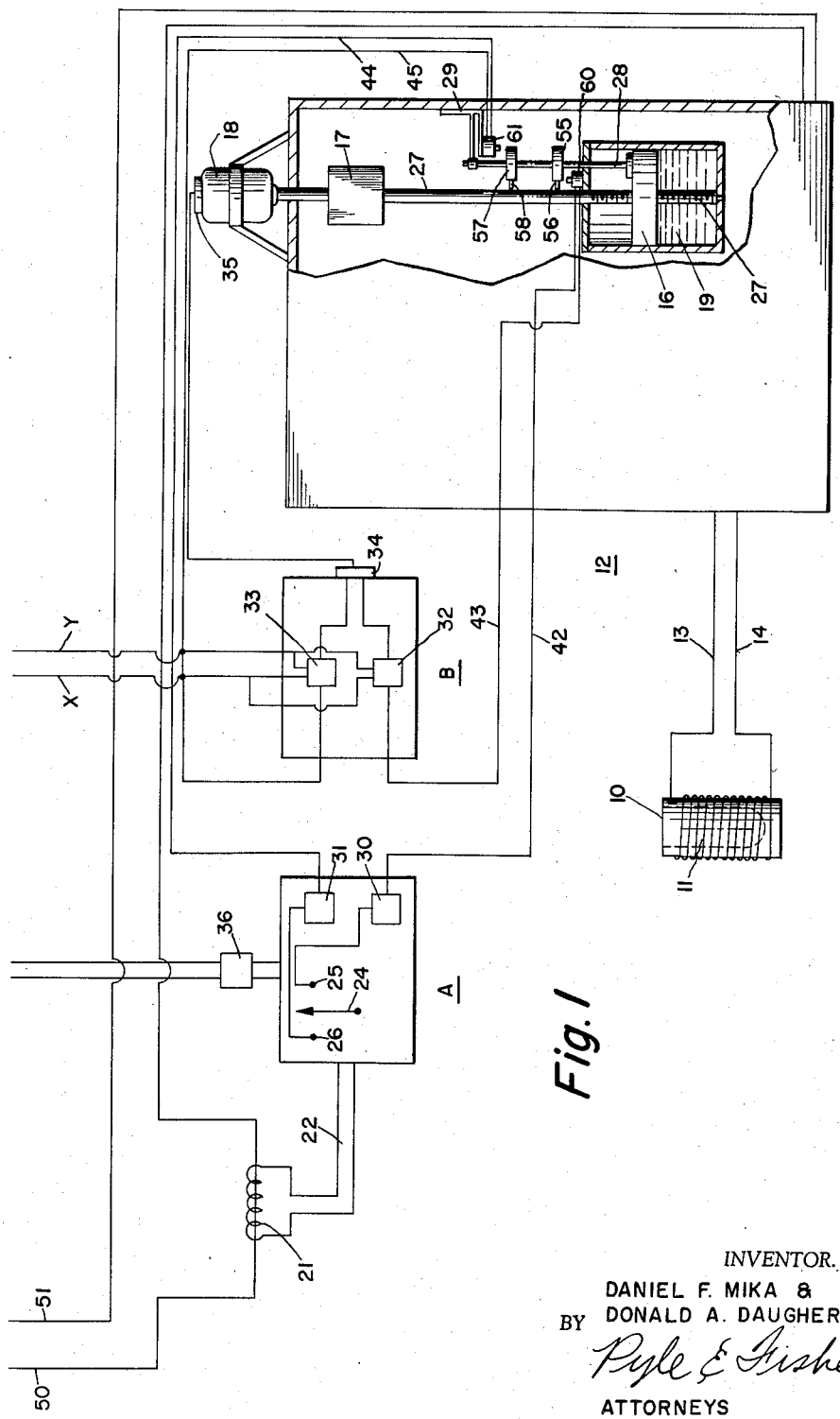

Jan. 13, 1959

D. F. MIKA ET AL 2,868,902

INDUCTION HEATER CONTROL

Filed March 19, 1958

2 Sheets-Sheet 1

INVENTOR.
DANIEL F. MIKA &
BY DONALD A. DAUGHERTY

Pyle & Fisher

ATTORNEYS

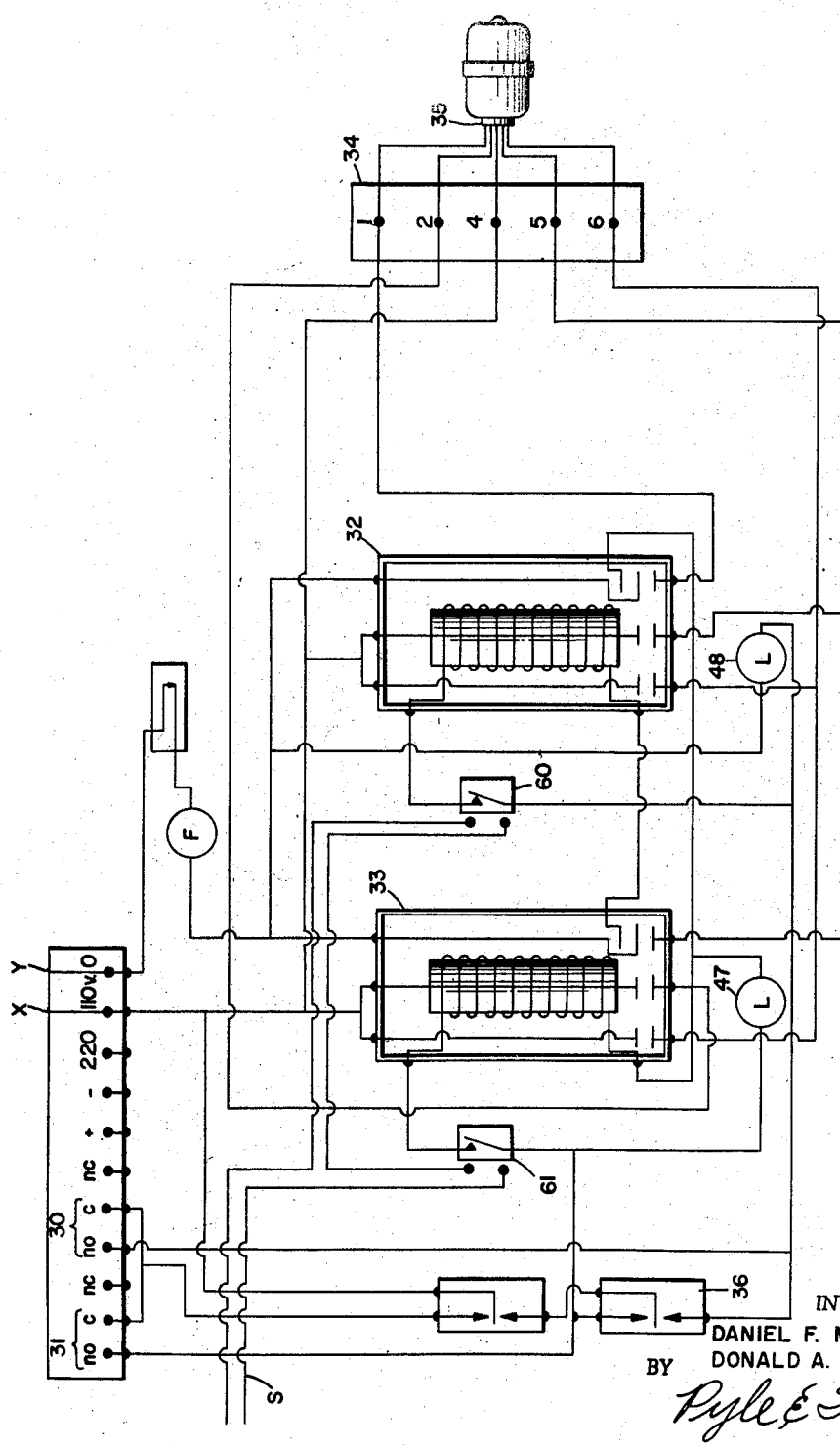

United States Patent Office 2,868,902
Patented Jan. 13, 1959

2,868,902

INDUCTION HEATER CONTROL

Daniel F. Mika, Willoughby, and Donald A. Daugherty, Euclid, Ohio, assignors to Precision Metalsmiths, Inc.

Application March 19, 1958, Serial No. 722,515

1 Claim. (Cl. 219—10.77)

This invention relates to induction heaters and more particularly to an automatically responsive mechanism to maintain substantially constant power from a power converter to an induction heater, particularly as applied to metal melting.

Induction heating is now used in many applications for the melting of metal, particularly in laboratory quantities and for investment casting practices. In such a device, induction coils are wound around the melting pot and electric potential is applied to the coils. A charge of metal to be melted is disposed in the pot. The charge is melted by short circuited current induced in the charge by the induction coil.

As the temperature of the metal in a charge increases, and as the metal changes from the solid to the liquid state, the induced current flow changes and requires an alteration of the applied potential to maintain the most efficient condition.

Accordingly, one of the principal objects of this invention is to provide an induction heater in which the power supplied to an induction heating coil is automatically responsive to electrical conditions of the material being heated.

Another object of this invention is to provide an automatic mechanism responsive to electrical conditions of the heated material, which mechanism controls the output of a frequency changer to increase or decrease the power output of the changer.

A further and more specific object of the invention is to provide a mechanism in which a transformer secondary winding is disposed within a magnetic field set up by a power conductor of the converter, and in which an electropotential responsive device is connected to the winding output. The responsive device has first and second contacts disposed within the range of operation of the current responsive device and in which movement of the current responsive device to either a maximum or a minimum position will close maximum and minimum condition circuits to activate a reversible motor in either of two directions and thereby operate a control mechanism.

These listed objects will outline the invention, but other objects and a fuller understanding of the invention may be had by referring to the following description and claim, taken in conjunction with the accompanying drawings, in which:

Figure 1 is a diagrammatic illustration of the automatic control mechanism of this invention; and, Figure 2 is a wiring diagram of the invention.

Referring to the drawings and to Figure 1 in particular, a melting pot is shown at 10. An induction coil 11 is wound around the melting pot 10. Power is supplied to the coil 11 by a frequency changer 12 through conductors 13, 14. As current flows through these conductors, and thence through the induction coil 11, an induction field is set up by the coil 11. This inducing field causes an induced short-circuited current flow in metals contained within the pot 10. The induced current flow causes the metal in the pot 10 to heat and melt.

The principal problem is to maintain the apparatus at peak efficiency for economy, and to produce a desired resultant effect. Melting, of chunk metal or shot is a particular problem, because the metal charge changes electrical characteristics considerably as it first heats and then changes state. To produce the desired control, alteration of the voltage from the converter is employed.

In the disclosed and preferred embodiment, the converter is of the type in which a plunger 16 coacts with a mercury bath 19 to indirectly control the power output. Control of the power output is effected by shifing the plunger axially in a mercury bath. This shifting is controlled by a speed reducer 17 which is driven by a reversible electric motor 18.

More specifically, in this particular type of converter, a rotatable screw shaft 27 is driven from the speed reducer 17 and the plunger 16 is threadably carried by the shaft 27. Accordingly, rotation of the shaft in one direction will cause the plunger 16 to descend into the mercury bath, and force the mercury bath from the container in which it is held, whereas reversal of the shaft 27 will raise the plunger 16 and allow the mercury to flow back into the container. Previously, the plunger has been moved by a manual control. Such control is subject to human error and lack of prompt attention. Therefore, this invention provides a unique control to drive the plunger 16 by means of the motor 18.

The converter 12 is supplied by conventional frequency power lines 50 and 51. A transformer secondary coil 21 is disposed about the input conductor 50 and is activated by the magnetic field of the conductor 50. The coil 21 is of minimal size to simply sample the current in order to detect any change in magnitude thereof.

The transformer coil 21 is connected through conductors 22 to a responsive device. The illustrated responsive device is a milliammeter and preferably is one in which an indicator needle 24 moves through a condition indicating range. High and low contacts 25, 26 are disposed within the responsive range of the needle 24, and the needle is used as an electrical contact to close one of two power circuits.

The two power circuits consist of controls and power feed to the motor 18, either to drive the motor in a clockwise or counterclockwise direction for the desired control.

Generally as one may see by a cursory examination of the drawing Figure 1, the sample of power in coil 21 will close one of the two circuits, or no circuits, as the case may be.

The sample of power is not of a working magnitude. It is sufficient to excite a control. The effect is then magnified into control power. In the Figure 1, this is done in two stages, but may be done equally as well in only one stage. Since the invention has been successfully operated as illustrated, it is set forth as the preferred embodiment. Thus, a first control pack A and a second control pack B jointly supply and control the power to motor 18.

Line power is supplied through a reducer transformer 36 to the needle 24. Needle 24, contact 25, and relay 30 make up one control circuit. Needle 24, contact 25, and relay 31, make up another control circuit.

From the pack A, relays 30 and 31 send out a stronger signal, but not of sufficient power to drive motor 18. Through indirect safety circuits, the signals are directed to relays 32, 33. Here, power of a drive intensity is directed from power lines X and Y through designated circuits to the motor 18. Attention is now directed to Figure 2 for a detail wiring diagram where it will be seen how the pack B is actually wired to control the power.

A manual and an automatic control are provided in Figure 2. Manual control is not self limiting; and, of course, automatic control is always subject to malfunction or slow response. Therefore, safety circuits are interposed between pack A and pack B.

In order to prevent over-control of the converter, either through neglect while under manual control, or by failure of automatic devices, a limiting apparatus has been provided. The limiting safety apparatus, as illustrated in the Figure 1, is built around a rod 28 physically riding the top of the plunger 16. A guide bearing 29 directs the rod 28 in a vertically upright position.

A collar 55 is secured to the rod 28 at any selected position by means of a set screw 56. A limit switch 60, mounted in a position to be contacted by movement of the collar 55 toward the bath 19, is normally closed and may be opened by contact of the collar 55 against this switch 60. Thus, the collar 55 may be arbitrarily positioned to interrupt a power circuit delivering operative power to the motor 18, and because of the vertically adjustable nature of the collar 55, the adjustable drive of the shaft 27 may be arbitrarily limited to any selected position.

A similar collar 57 is set upon the rod 28 by means of a set screw 58. A limit switch 61 is employed to be contacted by the collar 57 whenever the collar 57 is elevated by upward movement of the rod 28. Thus, the upward movement of the plunger 16 may be arbitrarily limited to any selected degree by a chosen setting of the collar 57.

Normally, the limit switches 60 and 61 are not employed. They are not intended for regular limiting use. These are provided for the purpose of preventing damage to the converter equipment, or the burning of a charge in the melting pot 10, or the under-heating of the charge, all by neglect or improper operation of the control apparatus.

The mere stopping of drive by motor 18 at a maximum and minimum range by the switches 60 and 61 sometimes is insufficient protection. The control mechanism is not electrically connected to the circuit of the converter 12. Therefore, double pull, double throw switches are used and are interlocked into the circuit of the converter to turn off the entire converter in case of overload. The circuit from the switches 60 and 61 is designated by the reference "S" and is part of this invention.

Power supplied to the converter is fed through supply lines 50 and 51. The power generally will be provided in conventional 60-cycle frequency.

Primary relays 30, 31 are connectable through contacts 25, 26 to the needle 24 to complete a control circuit. The primary relays 30, 31 in turn are connected to power relays 32, 33 respectively. The power relays 32, 33 are in turn connected to operate a series of circuits which lead to a distribution panel 34. Leads are extended from panel 34 to a panel 35 of reversible motor 18. In Figure 1, these circuits are arbitrarily shown as lines; refer to the Figure 2 of the drawings for details of the actual control circuits at this point.

For clarity of illustration, as will be apparent by examination of the drawings, power supply conductors have in many cases been omitted in Figure 1; for example, only one conductor cable leads from the panel 34 to the panel 35.

In operation, a suitable charge is placed in the pot 10. The frequency changer 12 is activated to pass current through the coil 11. As a safety precaution, the original current will be provided on the low side. This will cause the indicator needle 24 to shift to the left, as seen in Figure 1, and contact the low contact 26. This contact of the needle 24 and the low contact 26 will close the circuit to activate the relay 31. Closing of the first low relay 31 will cause the second low relay 33 to close. This in turn will provide power to the motor through the connection 35, causing the motor to rotate in one direction to draw the plunger 16 from the mercury bath 19 and increase the power supplied through the conductors 13, 14.

As the power through the conductors 13, 14 is increased, the converter draws more power and therefore the current induced in the transformer coil 21 will be increased. The increased current in turn will cause the needle 24 to shift out of contact with the contact 26 as soon as the power current is in the preselected operating range.

As the metal in the pot 10 becomes hotter, the resistance to current flow will increase and therefore the current flow in the conductor 13 will decrease. This will be reflected by the indicator needle 24, which will again move to the left. When the needle 24 comes in contact with the contact 26, the relay 31 will again be closed which in turn will close the second power relay 33, causing the motor to rotate in one direction and withdraw the plunger 16 further from the mercury bath 19 to again increase the output supply.

When the resistance in the pot is decreased, as when additional metal is added to the charge, the reverse effect takes place. The current flow in the conductor 13 increases. This increased current flow in the conductors 50 and 51 will induce a current change in coil 21 to cause the needle 24 to move to the right into contact with the contact 25. This contact of the needle 24 and the contact 25 will close the primary relay 30. The primary relay 30 will in turn cause the power relay 32 to close and this closing will provide power to motor 18 through panel 34 and panel 35 to drive the motor in the opposite direction and lower the plunger 16 into the mercury bath 19. Lowering the plunger 16 into the mercury bath 19 will cause a reduction in current within conductor 50, 51. This in turn will cause the indicating needle 24 to move back into the preselected operating range.

As seen in wiring diagram of Figure 2, directional operating lamps 47, 48 may be wired in conjunction with directional power relays 33, 32 respectively to indicate whether or not relays 31, 33 and/or 30, 32 are operating.

While the invention has been described with a great deal of clarity and detail, it will be seen that it essentially comprises a mechanism which is an electronic servo mechanism connected to an induction heater and a frequency changer, in which mechanism means responsive to current flow in the induction coil heater conductors is utilized to regulate the output of the frequency changer.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In an induction heater activated by electric potential supplied by conductors connected to a variable frequency changer the improvement which comprises, a winding disposed within the field of magnetic influence of one of said conductors, an electric responsive device connected to said winding, said device having a responsive range, said device having maximum and minimum adjustable contacts in said range to form a two way switch, one side of said switch being closable when the current induced in said coil reaches a preselected maximum and the other side being closable at a preselected minimum, said changer including control means selectively operable to increase and decrease the output of said changer, said control means including a reversible electric motor, said control means also including a mercury bath and a plunger axially shiftable into and out of said bath, said plunger being operatively connected to said motor, said motor being operable to cause said axial shifting of the plunger, said motor having first and second input connections for driving the motor in opposite directions, maximum condition circuit means connecting said switch maximum contact to said first motor input connection, and minimum condition circuit means connecting the switch minimum contact to said second motor input connection, each of said circuit means including first and second relays series connected to activate the motor, the first relay being activated by closing of the connected side of the two way switch and the second relay being activated by the closing of the first, said motor being operable in one direction in response to impulses received through said maximum condition circuit means, said motor being operable in the other direction in response to impulses received from said minimum condition circuit means, each of said condition circuits including a limit switch, and limit switch activation means connected to said plunger and operatively engageable with one of the limit switches upon reaching a preselected maximum extremity of movement and operably engageable with the other of the limit switches upon reaching a preselected minimum extremity of movement.

References Cited in the file of this patent

UNITED STATES PATENTS

| | | |
|---|---|---|
| 2,416,172 | Gregory et al. | Feb. 18, 1947 |
| 2,624,830 | Muntz | Jan. 6, 1953 |

FOREIGN PATENTS

| | | |
|---|---|---|
| 615,150 | Great Britain | Jan. 3, 1949 |